United States Patent [19]

Lallave

[11] 3,998,490
[45] Dec. 21, 1976

[54] REMOVABLE AUXILIARY SEAT

[75] Inventor: Victorina Lallave, Brooklyn, N.Y.

[73] Assignee: The Raymond Lee Organization, Inc., New York, N.Y.; a part interest

[22] Filed: Sept. 12, 1975

[21] Appl. No.: 612,797

[52] U.S. Cl. .................... 297/243; 280/47.35; 297/250; 297/457
[51] Int. Cl.² .................................. A47C 15/00
[58] Field of Search .......... 297/218, 243, 244, 250, 297/254–256, 273–282, 457; 280/41 A, 41 B, 47.35, 47.38

[56] References Cited
UNITED STATES PATENTS

| | | | |
|---|---|---|---|
| 264,157 | 9/1882 | Hepburn | 280/47.35 |
| 1,302,444 | 4/1919 | Silvarman | 280/47.35 |
| 1,372,538 | 3/1921 | Olson | 280/47.35 |
| 2,517,785 | 8/1950 | Goldstein | 297/243 X |
| 2,751,232 | 6/1956 | Sundberg | 280/41 B |

Primary Examiner—James C. Mitchell
Attorney, Agent, or Firm—Daniel Jay Tick

[57] ABSTRACT

A sling type sheet of flexible material is formed with a seat surface, a back surface extending upwardly from the rear edge of the seat surface, and a pair of sides each extending between a corresponding side edge of the seat surface and a corresponding side edge of the back surface. Removable fasteners removably affix each of the sides of the sheet to a corresponding one of the side arms of the handle part of the frame of a baby stroller and removably affix the back surface at its upper edge to the head of such handle part.

2 Claims, 4 Drawing Figures

U.S. Patent     Dec. 21, 1976     3,998,490
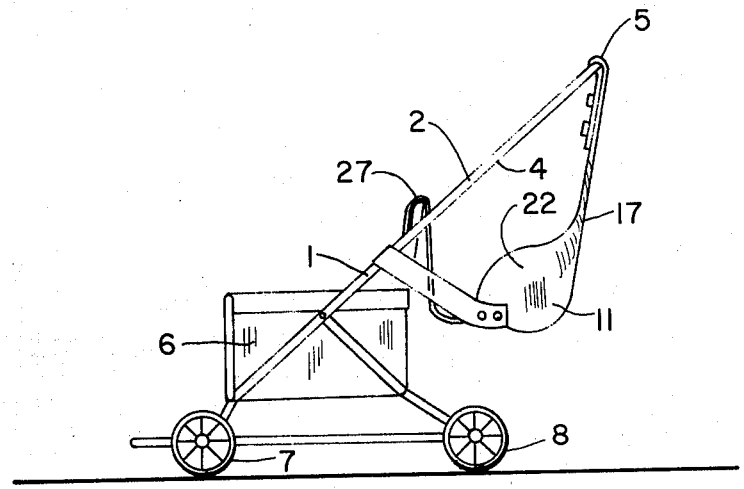
FIG. 1
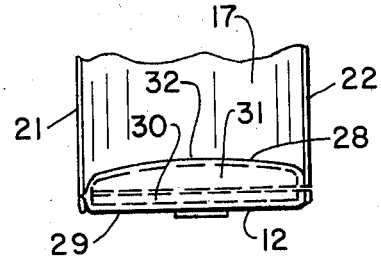
FIG. 4
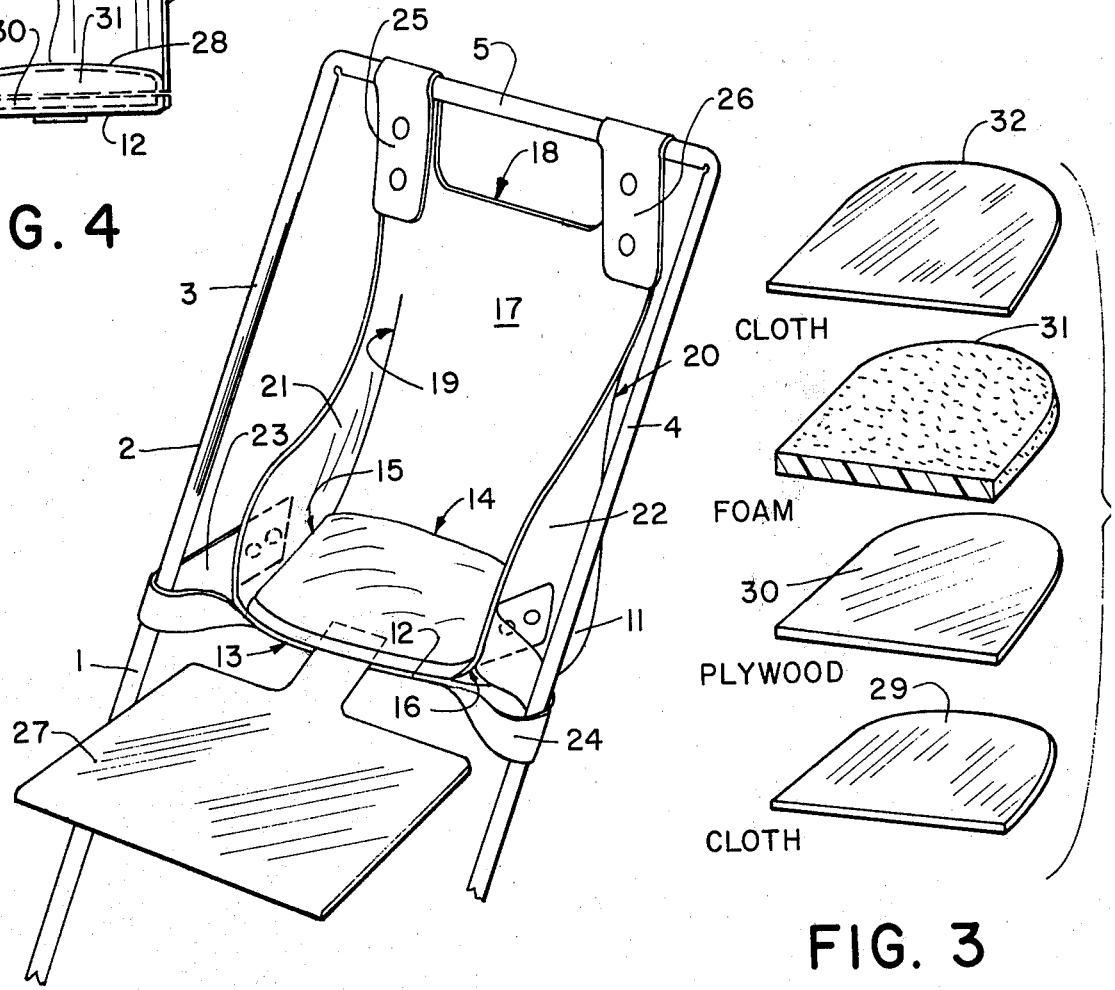
FIG. 2
FIG. 3

REMOVABLE AUXILIARY SEAT

DESCRIPTION OF THE INVENTION

The present invention relates to a removable auxiliary seat. More particularly, the invention relates to a removable auxiliary seat for a baby stroller having a frame with a substantially inverted square U-shaped handle part.

Objects of the invention are to provide a removable auxiliary seat of simple structure, which is inexpensive in manufacture, affixed to and removed from a babystroller with facility and convenience, stored in a minimum space, and functions efficiently, effectively and reliably to seat a second baby in a stroller in tandem behind a baby seated in the main seat of the stroller with comfort and safety.

In order that the invention may be readily carried into effect, it will now be described with reference to the accompanying drawing, wherein:

FIG. 1 is a side view of an embodiment of the removable auxiliary seat of the invention mounted on a stroller;

FIG. 2 is a perspective view of the embodiment of FIG. 1;

FIG. 3 is an exploded view of a seat part of the removable auxiliary seat of the invention; and FIG. 4 is an end view of the removable auxiliary seat of the invention showing the assembly of the seat part.

The removable auxiliary seat of the invention is for a baby stroller having a frame 1 with a substantially inverted square U-shaped handle part 2 having a pair of spaced substantially parallel side arms 3 and 4 and a head 5 joining the side arms and substantially perpendicular thereto, as shown in FIG. 2. The baby stroller supports a main seat 6 and is mounted on wheels 7, 8 (FIG. 1), 9 and 10 (not shown in the FIGS.). The main seat 6 seats a baby or infant.

The auxiliary seat of the invention is removably affixed to the baby stroller and is for seating a second baby or infant in tandem behind the main seat 6. The auxiliary seat comprises a substantially sling type sheet 11 of flexible material formed with a seat surface 12 (FIGS. 2 and 4) having a front edge 13, a rear edge 14 and a pair of side edges 15 and 16 (FIG. 2). The sheet 11 may comprise any suitable flexible material such as, for example, plastic, canvas, or the like. The sheet 11 is formed with a back surface 17 (FIGS. 1, 2 and 4) extending upwardly from the rear edge 14 of the seat surface 12 and having an upper edge 18 and a pair of side edges 19 and 20 (FIG. 2).

The sheet 11 is also formed with a pair of sides 21 and 22 (FIGS. 2 and 4) each extending between a corresponding side edge of the sheet surface 12 and a corresponding side edge of the back surface 17. Thus, the side 21 extends between the side edge 15 of the seat surface 12 and the side edge 19 of the back surface 17. The side 22 extends between the side edge 16 of the seat surface 12 and the side edge 20 of the back surface 17.

Removable fasteners removably affix each of the sides 21 and 22 of the sheet 11 to a corresponding one of the side arms 3 and 4 of the handle part 2 of the frame and removably affix the back surface 17 at its upper edge 18 to the head 5 of said handle part. The fasteners comprise a first pair of bands 23 and 24 of flexible material of any suitable type such as, for example, plastic, canvas, or the like. The band 23 passes around the side arm 3 of the handle part 2 of the frame and is removably affixed to the side 21 of the sheet 11 by any suitable fasteners such as, for example, snap fasteners. The band 24 passes around the side arm 4 of the handle part 2 of the frame and is removably affixed to the side 22 of the sheet 11 by any suitable fasteners such as, for example, snap fasteners.

The removable fasteners further comprise a second pair of bands 25 and 26 of flexible material of any suitable type, such as, for example, plastic, canvas, or the like. The band 25 passes around the head 5 of the handle part 2 and is removably affixed to the back surface 17 of the sheet 11 by any suitable fasteners, such as, for example, snap fasteners. The band 26 passes around the head 5 of the handle part 2 and is removably affixed to the back surface 17 of the sheet 11 in spaced relation with the band 25 by any suitable fasteners, such as, for example, snap fasteners.

A fastening band 27 of any suitable type of flexible material such as, for example, plastic, canvas, or the like, is affixed to the sheet 11 and extends from the front edge 13 of the seat surface 12 thereof (FIGS. 1 and 2). The fastening band 27 is draped over the back of the main seat 6 of the stroller and is removably affixed thereto by any suitable fasteners such as, for example, snap fasteners, as shown in FIG. 1.

The seat part of the removable auxiliary seat is preferably augmented by a cushion 28 comprising a layer of cloth 29 of any suitable type. A layer 30 of plywood is provided on the cloth 29. A layer of foam plastic or rubber 31 is provided on the plywood 30. The cushion 28 is covered by a layer of cloth 32. The cushion 28 is shown in exploded condition in FIG. 3.

While the invention has been described by means of a specific example and in a specific embodiment, I do not wish to be limited thereto, for obvious modifications will occur to those skilled in the art without departing from the spirit and scope of the invention.

I claim:

1. A removable auxiliary seat for a baby stroller having a frame with a substantially inverted square U-shaped handle part having a pair of spaced substantially parallel elongated side arms and a head joining the side arms and substantially perpendicular thereto, said stroller including a main seat supported on the side arm in the area of the lower half thereof and the side arms having an upper half extending below the head, said auxiliary seat comprising a substantially sling type sheet of flexible material formed with a seat surface having a front edge, a rear edge and a pair of side edges, a back surface extending upwardly from the rear edge of the seat surface and having an upper edge and a pair of side edges, and a pair of sides each extending between a corresponding side edge of the seat surface and a corresponding side edge of the back surface; and removable fastening means removably affixing each of the sides of the sheet to a corresponding one of the side arms of the handle part of the frame and removably affixing the back surface at its upper edge to the head of said handle part whereby the auxiliary seat is supported at the upper half of the side arms.

2. A removable auxiliary seat as claimed in claim 1, wherein the fastening means comprises a first pair of bands of flexible material each passing around a corresponding one of the side arms of the handle part of the frame and removably affixed to the corresponding side of the sheet and a second pair of bands of flexible material each passing around the head of said handle part and removably affixed to the back surface of said sheet in spaced relation with the other.

* * * * *